(12) United States Patent
Nakai

(10) Patent No.: US 10,937,567 B2
(45) Date of Patent: Mar. 2, 2021

(54) CONDUCTION PATH AND WIRE HARNESS

(71) Applicant: SUMITOMO WIRING SYSTEMS, LTD., Yokkaichi (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/622,494

(22) PCT Filed: Jun. 26, 2018

(86) PCT No.: PCT/JP2018/024201
§ 371 (c)(1),
(2) Date: Dec. 13, 2019

(87) PCT Pub. No.: WO2019/004214
PCT Pub. Date: Jan. 3, 2019

(65) Prior Publication Data
US 2020/0258654 A1    Aug. 13, 2020

(30) Foreign Application Priority Data

Jun. 29, 2017    (JP) .............................. JP2017-127269

(51) Int. Cl.
*H01B 7/04*     (2006.01)
*H01B 5/06*     (2006.01)
*H01R 11/12*    (2006.01)
*H02G 3/04*     (2006.01)
(Continued)

(52) U.S. Cl.
CPC ........... *H01B 7/04* (2013.01); *B60R 16/0215* (2013.01); *H01B 5/06* (2013.01); *H01B 7/0009* (2013.01);
(Continued)

(58) Field of Classification Search
CPC .......... H01B 7/04; H01B 5/06; H01B 7/0009; B60R 16/0215; H01L 37/0009; H01R 4/183; H01R 11/12
(Continued)

(56) References Cited

U.S. PATENT DOCUMENTS 3,587,030 A  *  6/1971  Ohnsorg ................ H01R 35/02
                                                   439/502
5,278,354 A  *  1/1994  Lhomme ................. H01R 4/72
                                                   174/84 C
(Continued)

FOREIGN PATENT DOCUMENTS

JP     2016219104       *  12/2016
WO  2016/158400 A1     10/2016
(Continued)

OTHER PUBLICATIONS

Jul. 31, 2018 International Search Report issued in International Patent Application No. PCT/JP2018/024201.

*Primary Examiner* — Timothy J Thompson
*Assistant Examiner* — Michael F McAllister
(74) *Attorney, Agent, or Firm* — Oliff PLC

(57) ABSTRACT

A conduction path that includes a tubular conductor; a flexible conductor that has better flexibility than the tubular conductor and is connected to the tubular conductor; and a terminal that is connected to the flexible conductor, wherein: an end of the flexible conductor in a lengthwise direction thereof is fixed at a fixing portion of the tubular conductor in a state in which the end is inserted into the tubular conductor, the fixing portion includes a first deformed portion in which an outer peripheral wall of the tubular conductor is deformed radially inward and holds the flexible conductor, and a second deformed portion that is further (Continued)

deformed radially inward from the first deformed portion and is connected to the flexible conductor.

5 Claims, 2 Drawing Sheets

(51) Int. Cl.
    *B60R 16/02*         (2006.01)
    *H01B 7/00*         (2006.01)
    *H01R 4/18*         (2006.01)

(52) U.S. Cl.
    CPC ............ *H01R 4/183* (2013.01); *H01R 11/12* (2013.01); *H02G 3/04* (2013.01)

(58) Field of Classification Search
    USPC ........................................................ 174/68.1
    See application file for complete search history.

(56) References Cited

U.S. PATENT DOCUMENTS

| | | | |
|---|---|---|---|
| 7,947,904 B2* | 5/2011 | Watanabe | H01R 4/184 174/72 A |
| 2014/0203068 A1* | 7/2014 | Hino | H01R 43/0207 228/199 |
| 2018/0122532 A1 | 5/2018 | Kushima et al. | |
| 2018/0131167 A1* | 5/2018 | Nakai | H02G 1/14 |
| 2019/0148033 A1 | 5/2019 | Kushima et al. | |

FOREIGN PATENT DOCUMENTS

| | | |
|---|---|---|
| WO | 2016/167107 A1 | 10/2016 |
| WO | 2016/171204 A1 | 10/2016 |

* cited by examiner

CONDUCTION PATH AND WIRE HARNESS

BACKGROUND

The present disclosure relates to a conduction path for an automotive wire harness or the like.

For example, WO2016/171204 discloses a conduction path for a wire harness, the conduction path including a tubular conductor that can maintain its shape, and a flexible conductor that has better flexibility than the tubular conductor and is connected to the tubular conductor. The tubular conductor and the flexible conductor are crimped to each other by the tubular conductor being squeezed from the outside thereof when an end of the flexible conductor in the lengthwise direction thereof is inserted into the tubular conductor. This crimping reliably ensures the electrical connection between the tubular conductor and the flexible conductor. Also, the other end of the flexible conductor in the lengthwise direction thereof (the end of the flexible conductor that is away from the tubular conductor) is connected to a terminal for connection to a device and the like. With such a conduction path, the portion of a routing path of the wire harness that needs to maintain its shape is constituted by the tubular conductor, and portions for which routing is difficult, such as the periphery of a device and the like, are constituted by the flexible conductor and therefore it is possible to improve the ease with which the wire harness can be installed in a vehicle.

SUMMARY

As with the conduction path in WO2016/171204 described above, if the conductor that is to be crimped to the tubular conductor is the flexible conductor, then the tubular conductor needs to deform (be squeezed) by a comparatively large amount in order to reliably ensure the electrical connection between the tubular conductor and the flexible conductor in the place that is crimped. For this reason, a large amount of stress is applied to the flexible conductor in the place where the flexible conductor is crimped, and thus there is a risk that unexpected damage may occur such as breakage of the flexible conductor.

An exemplary aspect of the disclosure provides a conduction path and wire harness with which it is possible to suppress the occurrence of damage to the flexible conductor in the portion in which the tubular conductor and the flexible conductor are connected.

A conduction path according to an exemplary aspect includes a tubular conductor, a flexible conductor that has better flexibility than the tubular conductor and is connected to the tubular conductor, and a terminal that is connected to the flexible conductor. One end of the flexible conductor in a lengthwise direction thereof is fixed with use of a fixing portion of the tubular conductor when the one end is inserted into the tubular conductor, and the fixing portion includes a first deformed portion in which the outer peripheral wall of the tubular conductor is deformed radially inward and holds the flexible conductor, and a second deformed portion that is further deformed radially inward from the first deformed portion and is connected to the flexible conductor.

With this configuration, stress is applied to the flexible conductor stepwise from the first deformed portion to the second deformed portion. For this reason, in the portion (the second deformed portion) in which the tubular conductor and the flexible conductor are connected, stress that is applied to the flexible conductor is mitigated and it is thus possible to suppress the occurrence of damage to the flexible conductor in the portion thereof that is connected to the tubular conductor.

In the conduction path described above, the fixing portion is formed at a position that is away from an open end of the tubular conductor into which the flexible conductor is to be inserted.

With this configuration, the shape of the open end of the tubular conductor into which the flexible conductor is to be inserted is retained without being squashed, and therefore it is possible to suppress the occurrence of damage to the flexible conductor in the open end of the tubular conductor. Also, as this configuration does not require a high level of precision in regards to the position at which the fixing portion is formed in the axial direction (lengthwise direction) of the tubular conductor, it is possible to improve the ease with which the tubular conductor and the flexible conductor can be attached to each other.

In the conduction path described above, the first deformed portion and the second deformed portion are formed in an annular shape in the circumferential direction of the tubular conductor.

With this configuration, it is possible to more reliably connect the tubular conductor to the flexible conductor with use of the second deformed portion, and as a result it is possible to more reliably ensure the electrical connection between the tubular conductor and the flexible conductor.

In the conduction path described above, the flexible conductor is made from a plurality of conductive wires, and includes a single core portion that is formed into a single core wire by bundling together leading end portions of the plurality of conductive wires to be inserted into the tubular conductor.

According to this configuration, the leading end portion of the flexible conductor that is to be inserted into the tubular conductor is a single core portion, and therefore it is possible to improve the ease with which the flexible conductor can be inserted into the tubular conductor.

A wire harness that solves the problems described above includes the conduction path described above.

With this configuration, it is possible to provide a wire harness that suppresses the occurrence of damage to the flexible conductor in the conduction path.

With the conduction path and wire harness of the present disclosure, it is possible to suppress the occurrence of damage to the flexible conductor in the portion in which the tubular conductor and the flexible conductor are connected.

BRIEF DESCRIPTION OFT DRAWINGS

FIGS. 4(*a*) to 4(*d*) are schematic diagrams showing a manufacturing mode of the conduction path in the embodiment.

DETAILED DESCRIPTION OF EMBODIMENTS

The following is a description of an embodiment of a conduction path and a wire harness in accordance with FIGS. 1 to 4. Note that, as a matter of convenience, the drawings may exaggerate or simplify parts of the described configurations. Also, the dimensional ratios of the parts may be different from the actual dimensional ratios thereof.

Figure 1:
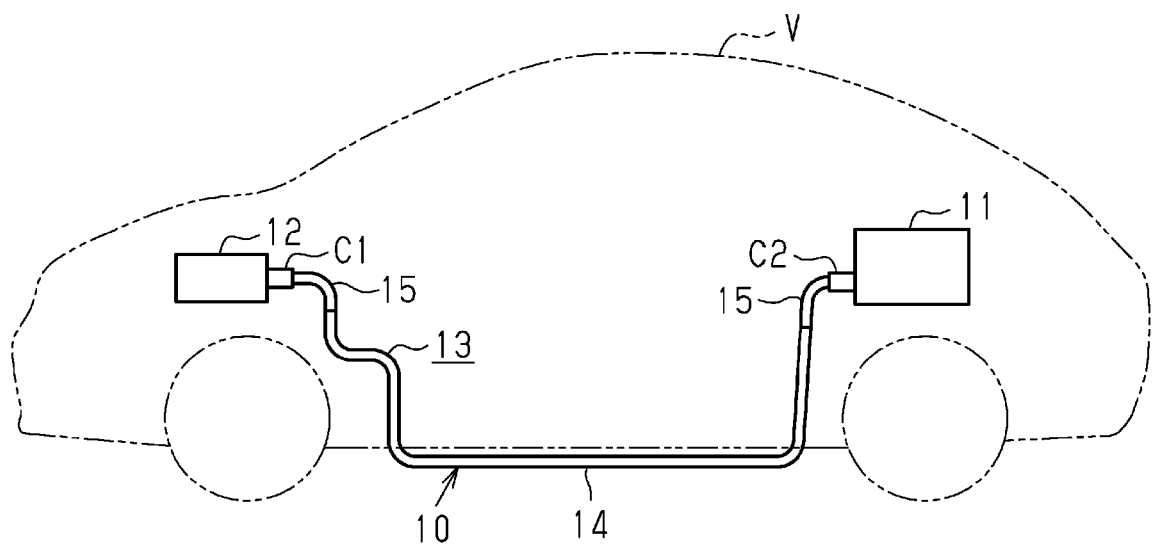
FIG. 1 is a schematic block diagram of a wire harness in an embodiment.

A vehicle V shown in FIG. 1 includes a high voltage battery 11 and an inverter 12 that are connected to each other by a wire harness 10. Note that in the present embodiment, the inverter 12 is provided in a front part of the vehicle V, and the high voltage battery 11 is provided in a rear part of the vehicle V. The high voltage battery 11 can supply a voltage of hundreds of volts. Also, the inverter 12 is connected to a wheel-driving motor (not shown) that is the source of power for moving the vehicle, generates AC power from DC power of the high voltage battery 11, and supplies the generated AC power to the motor.

The wire harness 10 includes a plurality of conduction paths 13 (only one of which is shown in FIG. 1), a first connector C1 that is provided on one end portion of the conduction path 13, and a second connector C2 that is provided on the other end of the conduction path 13. The first connector C1 is connected to the inverter 12, and the second connector C2 is connected to the high voltage battery 11. Thus, the high voltage battery 11 and the inverter 12 are electrically connected to each other by the conduction path 13. Note that the wire harness 10 in the present embodiment may also include a protective outer covering, such as a corrugated tube, that covers the outer periphery of the conduction path 13. Also, it is preferable that the wire harness 10 includes tubular braiding as an electromagnetic shield that collectively covers the plurality of conduction paths 13.

Figure 2:
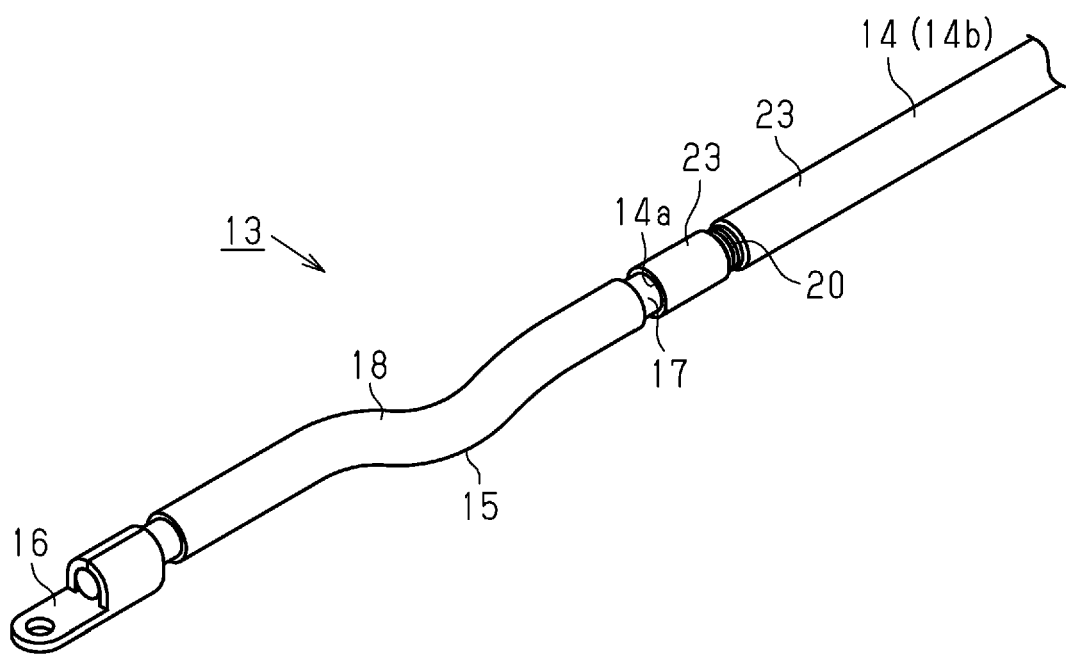
FIG. 2 is a perspective view showing a part of the conduction path in the embodiment.

The conduction paths 13 include a tubular conductor 14 and two flexible conductors 15 that are each respectively fixed to an end of the tubular conductor 14 in the lengthwise direction thereof. Also, as shown in FIG. 2, the conduction paths 13 include two terminals 16 that are each respectively connected to the flexible conductors 15. The tubular conductor 14, the flexible conductors 15, and the terminals 16 are electrically conductive with each other. One of the terminals 16 is connected to the first connector C1, and the other terminal 16 is connected to the second connector C2.

The tubular conductor 14 is made from a metal pipe, which may be aluminum, for example, that can maintain its shape. The tubular conductor 14 is routed so as to run under the floor of the vehicle V or the like, for example. In other words, the portion that needs to be easy to route and maintain its shape in the routing path of the conduction path 13 is constituted by the tubular conductor 14.

The flexible conductor 15 has better flexibility than the tubular conductor 14, and in the present embodiment is made from a coated wire that is a core wire 17 covered by an insulating coating 18 made of a resin. The core wire 17 is a stranded wire made from a plurality of conductive wires (such as copper wires or aluminum wires). Both ends of the flexible conductor 15 in the lengthwise direction thereof have the insulating coating 18 removed to expose the core wire 17, with one exposed region of the core wire 17 being fixed to an end portion of the tubular conductor 14 in the lengthwise direction thereof. Also, the terminal 16 is fixed to the other exposed region of the core wire 17. Thus, in the routing path of the conduction path 13, the flexible conductor 15 constitutes the portion of the conduction path 13 that corresponds to the periphery of the high voltage battery 11 and the inverter 12, which has limited space thus making routing difficult.

Next, the fixing structure of the core wire 17 of the flexible conductor 15 and the tubular conductor 14 will be described.

Figure 3:
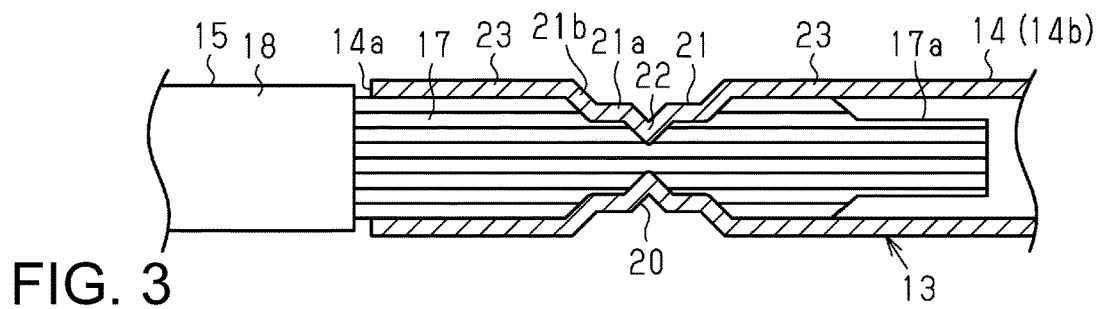
FIG. 3 is a cross-sectional view schematically showing a part of the conduction path in the embodiment.

As shown in FIG. 3, the core wire 17 of the flexible conductor 15 is inserted into the tubular conductor 14 from an open end 14a of one end portion of the tubular conductor 14 in the lengthwise direction thereof. The core wire 17 is then fixed by a fixing portion 20 that is formed in the tubular conductor 14. Note that the leading end portion of the core wire 17 that is to be inserted into the tubular conductor 14 is constituted as a single core portion 17a that is formed by bundling together the plurality of conductive wires that constitute the core wire 17 into a single core wire. The outer diameter of the single core portion 17a, or more specifically the outer diameter of the leading end portion of the core wire 17, is small, for example, compared to the outer diameter of other parts of the core wire 17.

The fixing portion 20 includes a first deformed portion 21 that is formed such that an outer peripheral wall 14b of the tubular conductor 14 deforms radially inward, and a second deformed portion 22 that is further deformed radially inward from the first deformed portion 21 and is connected to the core wire 17. The first deformed portion 21 and the second deformed portion 22 are formed around the entire outer peripheral wall 14b in the circumferential direction thereof. In other words, the first deformed portion 21 and the second deformed portion 22 are formed in an annular shape in the circumferential direction of the tubular conductor 14.

The first deformed portion 21 includes a cylindrical portion 21a that has a cylindrical shape and is parallel with the axis direction of the tubular conductor 14. Also, the first deformed portion 21 includes a tapered portion 21b that has a shape that expands radially from both ends of the cylindrical portion 21a in the axial direction thereof to a non-deformed portion 23 (the portion that is not deformed radially inward and has a larger diameter than the first deformed portion 21) of the tubular conductor 14.

The first deformed portion 21 is formed at a position that is away from an open end 14a of the tubular conductor 14 into which the core wire 17 of the flexible conductor 15 is inserted, toward the middle of the tubular conductor 14 in the lengthwise direction thereof. For this reason, the tubular conductor 14 includes the non-deformed portion 23 between the first deformed portion 21 and the open end 14a. Also, the first deformed portion 21 has a shape that is radially contracted in relation to the non-deformed portion 23. The first deformed portion 21 is formed at a position corresponding to a portion other than the single core portion 17a in the core wire 17 of the flexible conductor 15.

The second deformed portion 22 is formed in the center of the first deformed portion 21 (the cylindrical portion 21a) in the axial direction thereof. The second deformed portion 22 sinks inward in the shape of the letter "V" in a cross-sectional view thereof in the radial direction of the tubular conductor 14. Also, the second deformed portion 22 has a shape that radially contracts relative to the first deformed portion 21. The second deformed portion 22 is pressed against (crimped to) the core wire 17. In other words, a part of the core wire 17 that is positioned on the inner side of the second deformed portion 22 is compressed radially inward by the second deformed portion 22, and thus there is almost no gap between the conductive wires of the core wire 17 in said part of the core wire 17. Thus, in the second deformed portion 22, the electrical connection between the core wire 17 of the flexible conductor 15 and the tubular conductor 14 is more reliably ensured.

Note that on the inner side of the cylindrical portion 21a of the first deformed portion 21, the outer circumference of the core wire 17 is in contact with the inner peripheral surface of the cylindrical portion 21a, but the core wire 17 is not as compressed as the inner side of the second deformed portion 22, and gaps remain between the conductive wires of the core wire 17 to some extent.

Next, a method will be described for attaching the core wire 17 of the flexible conductor 15 and the tubular conductor 14 to each other.

Figure 4A:
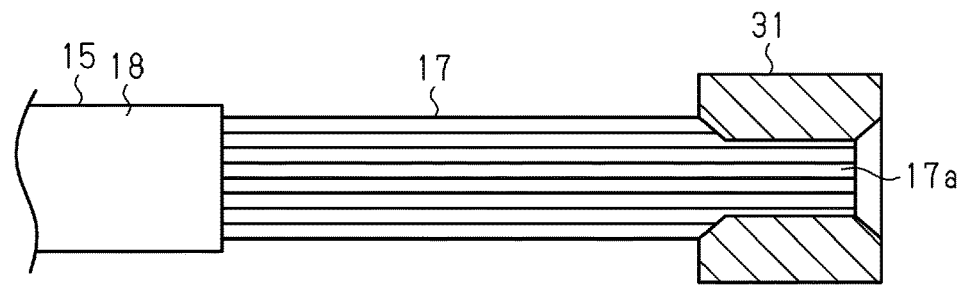

First, as shown in FIG. 4(a), the leading end portion of the core wire 17 of the flexible conductor 15 that is exposed from the insulating coating 18 is shaped into the single core portion 17a through heat welding (resistance welding) with use of a first jig 31. The single core portion 17a is made to be a single core wire without gaps between the conductive wires thereof by heat welding the plurality of conductive wires of the core wire 17 to each other.

Figure 4B:
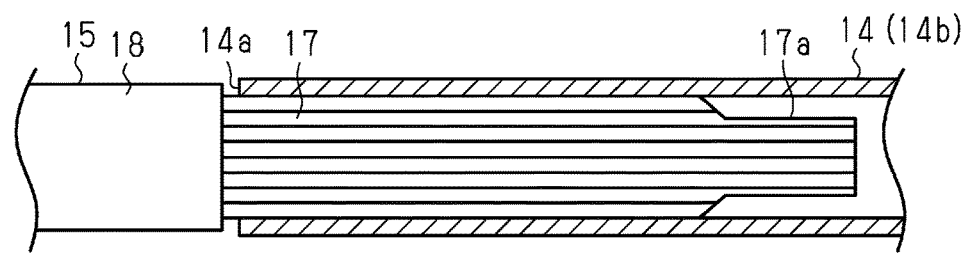

Next, as shown in FIG. 4(b), the leading end portion of the core wire 17 of the flexible conductor 15 is inserted into the tubular conductor 14 from the open end 14a. At this time, the single core portion 17a is formed at the leading end portion of the core wire 17, and therefore it is possible to suppress a situation in which the conductive wires of the leading end portion of the core wire 17 bulge and become difficult to insert into the tubular conductor 14.

Figure 4C:
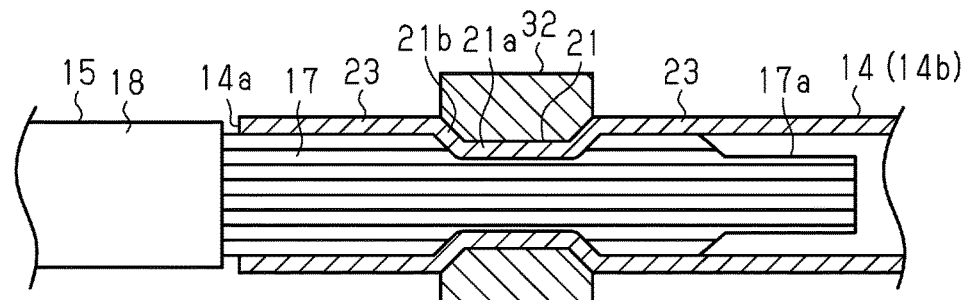

Next, as shown in FIG. 4(c), the first deformed portion 21 is shaped with use of a second jig 32 (first deformed portion 21 shaping process). The second jig 32 is, for example, made of a pair of presses that have a substantially semicircular shape and face each other, and presses the outer peripheral wall 14b of the tubular conductor 14 so as to radially contract the outer peripheral wall 14b of the tubular conductor 14. In this process, the outer peripheral wall 14b of the tubular conductor 14 is deformed radially inward, and the cylindrical portion 21a and the tapered portion 21b are thus shaped. At this time, the cylindrical portion 21a is in pressure contact with the core wire 17, but the stress that is applied to the core wire 17 by the pressure contact of the cylindrical portion 21a is weaker than the stress that is applied from the second deformed portion 22 to the core wire 17, and gaps between the conductive wires in the core wire 17 inward of the cylindrical portion 21a remain to some extent. Also, the cylindrical portion 21a holds the core wire 17 so as to restrict the flexible conductor 15 from moving in the axial direction (lengthwise direction) of the tubular conductor 14. Thus, the core wire 17 is temporary fixed in place. Thus, the occurrence of removal of the core wire 17 from the tubular conductor 14 is suppressed, and the workability of attachment is improved.

Figure 4D:
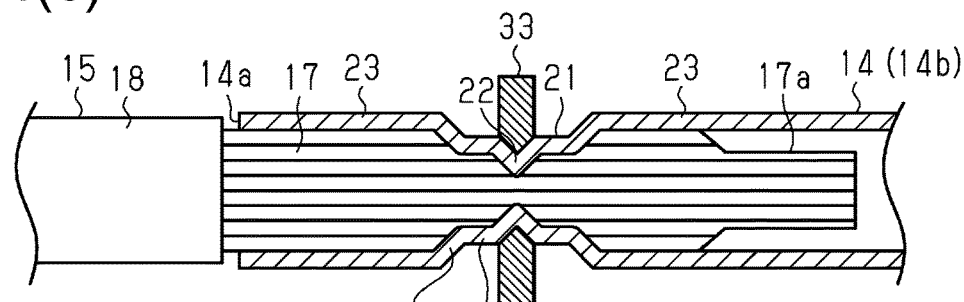

Next, as shown in FIG. 4(d), the second deformed portion 22 is shaped with use of a third jig 33 (second deformed portion shaping process). In this process, the second deformed portion 22 is formed through spinning, swaging, or the like, with use of the third jig 33. More specifically, when the third jig 33 has been pressed against the outer circumferential surface of the cylindrical portion 21a, the tubular conductor 14 and the third jig 33 are rotated relative to each other. Thus, the cylindrical portion 21a is locally radially contracted and the second deformed portion 22 is shaped. The inner surface of the second deformed portion 22 is pressed against (crimped to) the core wire 17, and there are almost no gaps between the conductive wires of the core wire 17 at the position where the core wire 17 is pressed against. Thus, the electrical connection between the tubular conductor 14 and the core wire 17 is more reliably ensured.

Next, the operation of the present embodiment will be described.

The fixing portion 20 of the tubular conductor 14 is radially contracted stepwise from the first deformed portion 21 to the second deformed portion 22. In other words, the stress that is received by the core wire 17 of the flexible conductor 15 from the fixing portion 20 increases stepwise from the first deformed portion 21 to the second deformed portion 22.

Here, as an embodiment (comparative example) that is different to the present embodiment, a configuration is conceivable in which only one step is formed through pressing (for example, a process in which the outer peripheral wall 14b of the tubular conductor 14 that does not have the first deformed portion 21 formed therein is deformed radially inward with use of the third jig 33 and is pressed against the core wire 17). With this configuration, because stress is applied locally to the core wire 17, there is a risk that unexpected damage may occur such as breakage of the core wire 17. Also, with this configuration, the tubular conductor 14 is radially contracted in one step from the outer diameter of the non-deformed portion 23 to an outer diameter capable of pressing against the core wire 17, and therefore a significant reduction of rigidity occurs in the place that is deformed.

In this respect, in the present embodiment as described above, the stress that is received by the core wire 17 from the fixing portion 20 increases stepwise from the first deformed portion 21 to the second deformed portion 22, mitigating the stress that is applied to the core wire 17 in the place that is pressed (second deformed portion 22), and as a result it is possible to suppress the occurrence of damage to the core wire 17 in the place that is pressed. Also, the tubular conductor 14 is radially contracted stepwise by the first and second deformed portions 21 and 22, and therefore the occurrence of rigidity reduction of the tubular conductor 14 is suppressed relative to the above-described comparative example.

Next, the effects of the present embodiment will be described.

(1) The fixing portion 20 that is fixed to the core wire 17 (the flexible conductor 15) in the tubular conductor 14 includes the first deformed portion 21 in which the outer peripheral wall 14b of the tubular conductor 14 is deformed radially inward and holds the core wire 17, and the second deformed portion 22 that is further deformed radially inward from the first deformed portion 21 and is connected to the core wire 17. According to this configuration, stress is applied to the core wire 17 stepwise from the first deformed portion 21 to the second deformed portion 22. This stepwise application of stress mitigates the stress that is applied to the core wire 17 in the portion (the second deformed portion 22) in which the tubular conductor 14 and the core wire 17 are connected, and it is thus possible to suppress the occurrence of damage to the core wire 17 in the portion thereof that is connected to the tubular conductor 14.

(2) The fixing portion 20 is formed at a position that is away from the open end 14a of the tubular conductor 14 into which the core wire 17 of the flexible conductor 15 is inserted. Thus, the shape of the open end 14a of the tubular conductor 14 is retained without being squashed (becomes the non-deformed portion 23), and therefore it is possible to suppress the occurrence of damage to the core wire 17 in the open end 14a. Also, as this configuration does not require a high level of precision in regards to the position at which the fixing portion 20 is formed in the axial direction (lengthwise direction) of the tubular conductor 14, it is possible to improve the ease with which the tubular conductor 14 and the core wire 17 can be attached to each other.

(3) The first deformed portion 21 and the second deformed portion 22 are formed in an annular shape in the circumferential direction of the tubular conductor 14. Thus, it is possible to more reliably connect the tubular conductor 14 to the core wire 17 with use of the second deformed portion 22, and as a result it is possible to more reliably ensure the electrical connection between the tubular conductor 14 and the core wire 17.

(4) The core wire 17 of the flexible conductor 15 is made from a plurality of conductive wires, and includes the single core portion 17a that is formed into a single core by bundling together the leading end portions of the plurality of conductive wires to be inserted into the tubular conductor 14. Thus, it is possible to improve the ease with which the core wire 17 can be inserted into the tubular conductor 14.

Note that the embodiment described above can be modified as described below.

The configuration and method of shaping the single core portion 17a in the embodiment described above have been illustrated, but the single core portion 17a may also be shaped with ultrasonic welding, soldering, or the like. Also, the single core portion 17a may be omitted from core wire 17 of the embodiment described above.

With the embodiment described above, the second deformed portion 22 is connected to (pressed against) a portion other than the single core portion 17a in the core wire 17, but there is no limitation to this and the second deformed portion 22 may also be connected to (pressed against) the single core portion 17a.

With the embodiment described above, the core wire 17 of the flexible conductor 15 is made of stranded wire, but instead of stranded wire, the core wire 17 may also be a braided member constituted by wire members having conductivity being braided together. It is also possible to omit the insulating coating 18 of the flexible conductor 15.

The fixing portion 20 of the embodiment described above is formed at a position that is away from the open end 14a of the tubular conductor 14, but there is no limitation to this and, for example, the first deformed portion 21 of the fixing portion 20 may also be formed in the open end 14a.

With the embodiment described above, the second deformed portion 22 sinks radially inward in the shape of the letter "V" in a cross-sectional view thereof, but this is illustrative only, and it is possible to modify the shape to that of the letter "U" in a cross-sectional view thereof, the shape of the letter "U" with sharp corners in a cross-sectional view thereof, or the like.

The first and second deformed portions 21 and 22 in the embodiment described above are formed in the entire circumferential direction of the tubular conductor 14, but there is no particular limitation thereto and, for example, may be formed in a range of half of the circumferential direction of the tubular conductor 14.

With the embodiment described above, after the first deformed portion 21 is shaped with use of the second jig 32, the second deformed portion 22 is shaped with use of the third jig 33 that is different from the second jig 32, but there is no limitation to this, and the first and second deformed portions 21 and 22 may also be shaped with the use of one jig.

With the embodiment described above, the present disclosure is applied to the conduction path 13 that connects the high voltage battery 11 and the inverter 12 in the wire harness 10 of the vehicle V, but may also be applied to another conduction path (for example, a conduction path that is used in a bus bar apparatus of an in-vehicle battery) in the wire harness of a vehicle.

The embodiment and example variations described above may also be appropriately combined.

Next, the technical idea that can be comprehended from the above-described embodiment and example variations shall be appended below.

A method of manufacturing a conduction path, the conduction path including:
a tubular conductor that can maintain its shape;
a flexible conductor that has better flexibility than the tubular conductor and is connected to the tubular conductor; and
a terminal that is connected to the flexible conductor, the method including:
a step of after the flexible conductor is inserted into the tubular conductor, deforming the portion of the tubular conductor into which the flexible conductor is inserted radially inward and shaping a first deformed portion that holds the flexible conductor, and
a step of deforming the first deformed portion radially inward and shaping a second deformed portion that connects to the flexible conductor.

With this configuration, stress is applied to the flexible conductor stepwise from the first deformed portion to the second deformed portion, mitigating the stress that is applied to the flexible conductor in the portion (second deformed portion) in which the tubular conductor and the flexible conductor are connected, and it is thus possible to suppress the occurrence of damage to the flexible conductor in the portion thereof that is connected.

It will be apparent to those skilled in the art that the present disclosure may be embodied in other specific embodiments without departing from the technical idea thereof. For example, the components described in the embodiment (or one or more aspects) may have parts thereof omitted, or a number thereof may be combined.

The invention claimed is:

1. A conduction path comprising:
a tubular conductor;
a flexible conductor that has better flexibility than the tubular conductor and is connected to the tubular conductor; and
a terminal that is connected to the flexible conductor, wherein:
an end of the flexible conductor in a lengthwise direction thereof is fixed at a fixing portion of the tubular conductor in a state in which the end is inserted into the tubular conductor,
the fixing portion includes a first deformed portion in which an outer peripheral wall of the tubular conductor is deformed radially inward and holds the flexible conductor, and a second deformed portion that is further deformed radially inward from the first deformed portion and is connected to the flexible conductor.

2. The conduction path according to claim 1, wherein the fixing portion is formed at a position that is away from an open end of the tubular conductor into which the flexible conductor is to be inserted.

3. The conduction path according to claim 1, wherein the first deformed portion and the second deformed portion are formed in an annular shape in a circumferential direction of the tubular conductor.

4. The conduction path according to claim 1, wherein the flexible conductor is made from a plurality of conductive wires and includes a single core that is formed into a single core wire by bundling together leading ends of the plurality of conductive wires to be inserted into the tubular conductor.

5. A wire harness comprising the conduction path according to claim 1.

* * * * *